(12) United States Patent
Bellar et al.

(10) Patent No.: US 10,909,500 B2
(45) Date of Patent: Feb. 2, 2021

(54) SYSTEM AND METHOD FOR PROCESSING OF DESIGNATED ITEMS IN A FACILITY

(71) Applicant: Walmart Apollo, LLC, Bentonville, AR (US)

(72) Inventors: Jason Bellar, Bella Vista, AR (US); Jeremy Velten, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/426,950

(22) Filed: May 30, 2019

(65) Prior Publication Data
US 2019/0370745 A1    Dec. 5, 2019

Related U.S. Application Data

(60) Provisional application No. 62/678,467, filed on May 31, 2018.

(51) Int. Cl.
*G06Q 30/00* (2012.01)
*G06Q 10/08* (2012.01)
*H04N 7/18* (2006.01)
*G06F 16/22* (2019.01)
*G06K 7/14* (2006.01)

(52) U.S. Cl.
CPC ......... *G06Q 10/0875* (2013.01); *G06F 16/22* (2019.01); *G06K 7/1413* (2013.01); *H04N 7/183* (2013.01)

(58) Field of Classification Search
CPC .............. G06F 16/22; G06K 7/10445; G06K 7/10861; G06K 7/1413; G06Q 10/0875; H04N 7/183
See application file for complete search history.

(56) References Cited

U.S. PATENT DOCUMENTS

| 5,484,996 | A | * | 1/1996 | Wood | G09F 3/0297 |
|---|---|---|---|---|---|
| | | | | | 235/487 |
| 5,730,252 | A | | 3/1998 | Herbinet | |
| 6,280,544 | B1 | * | 8/2001 | Fox | B31D 1/02 |
| | | | | | 156/249 |
| 6,549,891 | B1 | | 4/2003 | Rauber et al. | |
| 7,261,511 | B2 | | 8/2007 | Felder et al. | |
| 7,591,630 | B2 | | 9/2009 | Lert, Jr. | |
| 9,152,828 | B2 | | 10/2015 | Goncalves et al. | |

(Continued)

OTHER PUBLICATIONS

International Search Report and Written Opinion for PCT/US2019/34598 dated Aug. 16, 2019, pp. 1-16.

*Primary Examiner* — Thien M Le
(74) *Attorney, Agent, or Firm* — McCarter & English, LLP

(57) ABSTRACT

Systems, methods, and machine-readable media are provided for processing of designated items in a facility. In exemplary embodiments, data is received from the scanning of a machine-readable identifier affixed to a first item and that type of item is identified as requiring special handling based on the data and unique criteria derived for the facility. The unique criteria are based at least in part on historical loss data associated with the facility. The item is placed in a secure storage location and one or more images taken by an imaging device of the designated item located in the secure storage location are taken. The images of the designated item in the secure storage location are associated with a record for the designated item in a database.

20 Claims, 6 Drawing Sheets

Designated Item Processing System 100

SCAN MODULE 102

IMAGING MODULE 104

DESIGNATION MODULE 106

(56) References Cited

U.S. PATENT DOCUMENTS

| | | | |
|---|---|---|---|
| 9,230,250 B1 | 1/2016 | Parker et al. | |
| 2002/0062898 A1* | 5/2002 | Austin | G06K 17/0025 |
| | | | 156/64 |
| 2008/0301009 A1* | 12/2008 | Plaster | G06Q 10/087 |
| | | | 705/28 |
| 2009/0008450 A1 | 1/2009 | Ebert et al. | |
| 2010/0065632 A1 | 3/2010 | Babcock et al. | |
| 2010/0138037 A1* | 6/2010 | Adelberg | G06Q 10/087 |
| | | | 700/241 |
| 2013/0252556 A1 | 9/2013 | Rasband | |
| 2014/0061305 A1* | 3/2014 | Nahill | G06K 7/1096 |
| | | | 235/438 |
| 2015/0034720 A1* | 2/2015 | Minogue | G06Q 10/0832 |
| | | | 235/385 |
| 2015/0203297 A1* | 7/2015 | Manning | F25D 13/06 |
| | | | 700/218 |

\* cited by examiner

SYSTEM AND METHOD FOR PROCESSING OF DESIGNATED ITEMS IN A FACILITY

CROSS-REFERENCE TO RELATED APPLICATION

This application claims priority to and benefit of U.S. Provisional Patent Application Ser. No. 62/678,467, filed on May 31, 2018, the disclosure of which is incorporated herein by reference in its entirety

BACKGROUND

In a retail setting, the delivery, unloading, and sorting of products at a facility are important components of an efficient operation of the facility. These delivery, unloading, and sorting processes may involve the use of a sorting system to initially process items from a delivery vehicle upon their arrival at the facility.

SUMMARY

In one embodiment, a system for special processing of designated items is provided. The system is configured to execute an imaging module a scan module, and a designation module. The scan module when executed scans a machine-readable identifier of incoming items to determine the type of item. The designation module receives data related to scanning of a machine-readable identifier affixed to the designated item from the scanning device and identifies a type of item as requiring special handling as a designated item based on a unique criteria derived for the facility, the unique criteria based at least in part on historical loss data associated with the facility. The item designated as requiring special processing is stored in a secure storage location. The imaging module when executed captures an image of the designated item located in the secure storage location in the facility. The image of the designated item in the secure storage location is associated with the scanned data record in a database.

In another embodiment, a computer implemented method for special processing of designated items is provided. The method includes scanning with an automated sorting device that includes a plurality of conveyors and sets of rollers, machine-readable identifiers affixed to one of a plurality of items. The method additionally includes receiving data related to scanning of a machine-readable identifier affixed to a first item of the plurality of items from the scanning device. The method further includes automatically sorting the plurality of items into two or more categories, each category associated with one of the plurality of conveyors or sets of rollers, and forwarding items in each category to one of the plurality of conveyors after being scanned based on the association. The method also includes identifying an item as a designated item requiring special handling based on the data and unique criteria derived for the facility, the unique criteria based at least in part on historical loss data associated with the facility. The method further includes receiving one or more images taken by the imaging device of the designated item located in a secure storage location in the facility; and associating the image of the designated item in the secure storage location with the designated item in a database.

In another embodiment, a non-transitory machine-readable medium is provided that stores instructions executable by a processing device. Execution of the instructions causes the processing device to implement a method for special processing of designated items. The method includes scanning with an automated sorting device that includes a plurality of conveyors and sets of rollers, machine-readable identifiers affixed to one of a plurality of items. The method additionally includes receiving data related to scanning of a machine-readable identifier affixed to a first item of the plurality of items from the scanning device. The method further includes automatically sorting the plurality of items into two or more categories, each category associated with one of the plurality of conveyors or sets of rollers, and forwarding items in each category to one of the plurality of conveyors after being scanned based on the association. The method also includes identifying an item as a designated item requiring special handling based on the data and unique criteria derived for the facility, the unique criteria based at least in part on historical loss data associated with the facility. The method further includes receiving one or more images taken by the imaging device of the designated item located in a secure storage location in the facility; and associating the image of the designated item in the secure storage location with the designated item in a database.

BRIEF DESCRIPTION OF THE DRAWINGS

The accompanying drawings, which are incorporated in and constitute a part of this specification, illustrate one or more embodiments and, together with the description, help to explain the embodiments. The drawings are not necessarily to scale, or inclusive of all elements of a system, emphasis instead generally being placed upon illustrating the concepts, structures, and techniques sought to be protected herein. In the drawings.

DETAILED DESCRIPTION

Exemplary embodiments provide a system for special processing of designated items. In one embodiment, items are received and processed from a delivery vehicle. Some items are designated to require special handling, such as items that have a high dollar value, a particular size, are regulated items, and/or are high theft items (e.g. items that have a history of being a focus of thefts at this particular facility or another facility). An initial processing of items flags the designated items as requiring special handling upon their arrival at the facility. For example, the items being delivered may be initially processed by a sorting system that scans machine-readable identifiers associated with the items and a designation module communicatively coupled to the sorting system identifies those items requiring special handling based on the identity of the item. Designated items are moved to a secure storage location where an imaging device takes one or more images of the items (e.g., still or video images) once they are secured in the storage location. The captured images are associated with data relating to the item and stored in a database to create a record of the secure handling of the item and the condition of the item.

Figure 1:
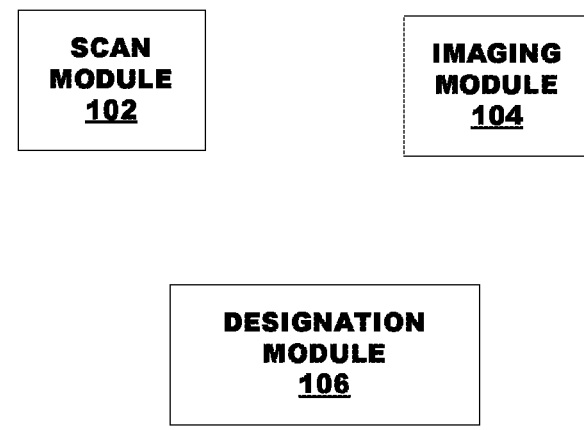
FIG. 1 is a block diagram showing a system for processing of designated items in terms of modules, according to an example embodiment.

FIG. 1 is a block diagram showing a designated item processing system 100 in terms of modules in an example embodiment. One or more modules may be implemented using server 430 shown in FIG. 4 while other modules may be implemented using computing devices 410, 420 shown in FIG. 4. The modules include a scan module 102, an imaging module 104, and a designation module 106. The modules may include various circuits, circuitry and one or more software components, programs, applications, or other units of code base or instructions configured to be executed by one or more processors. Although modules 102, 104, and 106 are shown as distinct modules in FIG. 1, it should be understood that modules 102, 104 and 106 may be implemented as fewer or more modules than illustrated. It should be understood that modules 102, 104 and 106 may communicate with one or more components included in system 400 (FIG. 4), such as client devices 410, 420, server 430, and database(s) 440.

The scan module 102 may be a hardware or software-implemented module configured to scan incoming items as they are unloaded and made ready for delivery or storage within a retail facility. The items have machine-readable identifiers which the scan module reads and uses to identify the item. In one embodiment, the scan module 102 may be integrated into an automated system such as a Flexible Automated Sortation Technology (FAST) system such as the one shown in FIG. 2. In another embodiment, the scan module may utilize handheld scanners equipped with network communication ability.

The designation module 106 may be a hardware or software-implemented module configured to identify items that require special handling. The determination used for designating an item as requiring special handling is derived based in part on unique criteria derived for the particular facility. In one embodiment, the unique criteria are based at least in part on historical loss data associated with the facility. When the scan of the machine-readable identifier identifies the item as one requiring special handling, the item is forwarded to an appropriate area in the facility containing that is a secure storage location. In one embodiment, designation module 106 is executed by a remotely located server communicatively coupled to scan module 102 and imaging module 104. In another embodiment, designation module 106 is integrated into the automated sorting system and communicates over a network with one or more databases to retrieve and store information relating to incoming items being processed at the facility.

The imaging module 104 may be a hardware or software-implemented module configured to capture one or more images of a designated item in the secure storage location. The captured image of the item is associated with the data for the item in a database. In one embodiment, the imaging module is integrated into an imaging device configured to take still or video images of items and is communicatively coupled to a computing device executing designation module 106.

Figure 2:
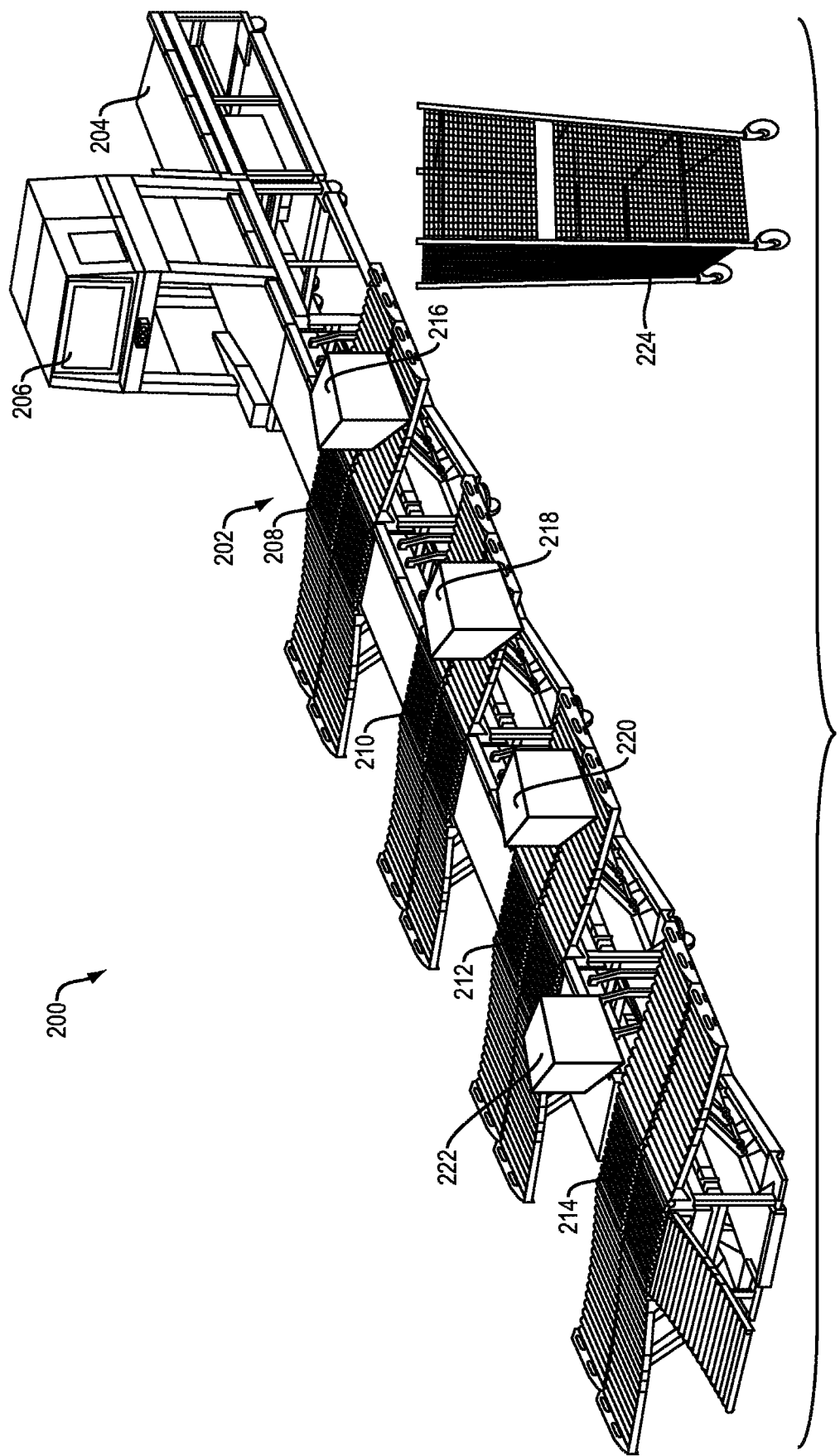
FIG. 2 is a diagram of an exemplary system for processing of designated items, according to an example embodiment.

FIG. 2 shows a diagram of an exemplary system 200 for providing designated item processing, according to an example embodiment. In one embodiment, a receiving system such as a Flexible Automated Sortation Technology (FAST) system 202 is used as part of the unloading of a delivery vehicle into a retail environment. Items are loaded onto the conveyor belt 204 of the FAST system and are scanned by scanner 206. The scanned items are then sorted by control of different sets of rollers and/or additional conveyor belts 208, 210, 212, 214 such that the item is directed to in the appropriate location of the FAST system based on the scanned identifier of the item. For example, each additional set of rollers and/or conveyor belt 208, 210, 212, 214 may be associated with a different category of product.

In this example, the FAST system 202 has received several items 216, 218, 220, and 222. The items are scanned by scanner 206 and a determination is made for each item regarding where the item should be forwarded and stored. In this example, item 216 is identified as requiring special handling. The item 216 is directed by conveyors or rollers 208 to a location attached to the system where the item can be picked up and stored in a secure storage container 224. In one embodiment, an associate is notified and places the item in a secure location. The associate can be notified by any number of ways, including but not limited to, a sound or series of sounds, a light, or vibration by way of a haptic vest being worn by the associate. In another embodiment, a robotic device is notified and transports the item to the secure location.

Item 218 is directed by control of conveyors or rollers 210 to a pick up spot, for example this is a sporting goods product and needs to be delivered to the sporting goods section of the store or to a place in the warehouse where sporting goods are stored. Item 220 is directed to a different pickup spot by conveyors or rollers 212, for example for toys. This item needs to be delivered to the toy section of the store or to a place in the warehouse where toys are stored. Item 222 is approaching conveyors or rollers 214 and has yet to be sorted.

In one embodiment, items requiring special handling such as item 216 may include items having a high dollar value, such as having a price that exceeds a pre-determined threshold. This pre-determined threshold may be different for different locations. A facility in New York may have a different dollar threshold regarding what qualifies as a high price item than a facility in Alaska. Another item requiring special handling may be an item that is particularly large (e.g. a large screen television) or an item that is relatively small (e.g. makeup). Another item requiring special handling may be an item that is regulated. Items such a guns, ammunition, and certain medications are examples of items that may be regulated. Another item requiring special handling may be an item that is a high theft item such as jewelry and portable electronics equipment (e.g. smartphones and ear buds). A theft index may be maintained by designated item processing system 100 and utilized by designation module 106 that includes theft rates for certain items for certain locations. An item may have a higher theft rate in one location as compared to the theft rate for the same item in another location. A facility in California may have a different threshold regarding what qualifies as a high theft item than a facility in Massachusetts. An item requiring special handling in one location may not require special handling in another location. In one embodiment, designation module 106 maintains different criteria for each facility or groups of facilities operated by a common entity.

In some embodiments, one or more imaging devices can take one or more images of the item after a scan, to confirm identity and condition and create a record of the item is actually a high value item. For example, the record creation confirms that the high value label is put on the proper item (e.g., the label is on a case of iPhone® ear pods and not on a case of chewing gum). In, some embodiments a camera is utilized to take a wide angle photo at the moment of processing the item, including taking a picture of the moment the associate places the item in a secure storage location such as a cage, locker, tower apparatus or other designated location in the facility to which access may be restricted. The system provides end to end closed loop confirmation of proper actions being taken with respect to the item and confirms the location of items at certain times in the event of damage, loss, theft, etc.

In some embodiments, the secure storage location includes a label that is visible at the moment the item is processed, so that the label is included in the image.

In one embodiment, the automated sorting system can further scan any of several identifying numbers or barcodes on the item such as the stock keeper Unit (SKU number, a serial number, a build number, etc. and append all of those numbers to the record associated with the item in a database with the time the data was captured in order to help determine when damage may have occurred to the item. In one embodiment, the record may be stored locally, and can be archived and moved offsite. In another embodiment, the data is sent to a remote database for appending to existing data related to the item.

Figure 3A:
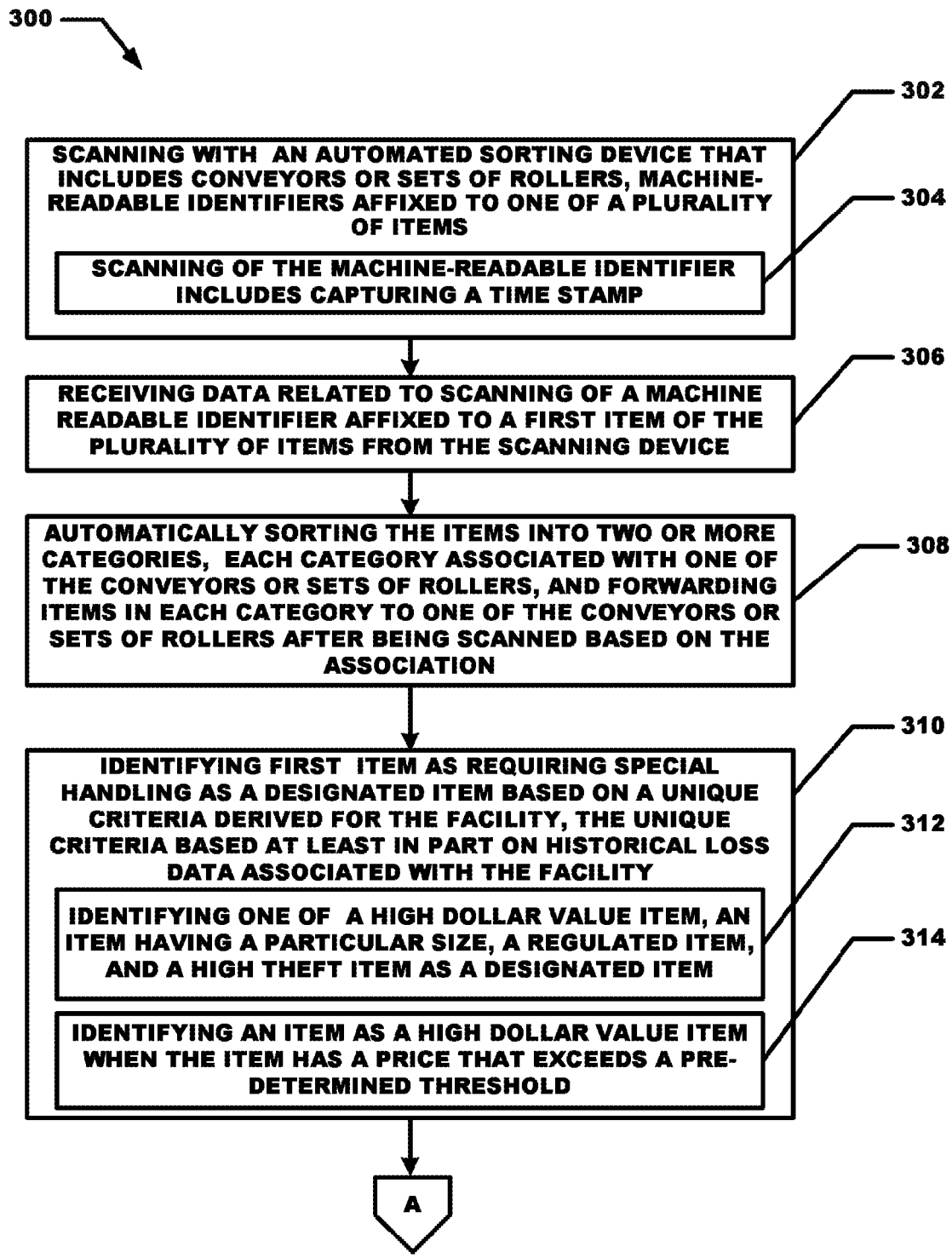
FIGS. 3A-3B are a flowchart illustrating an exemplary method for processing of designated items, according to an example embodiment.
Figure 3B:
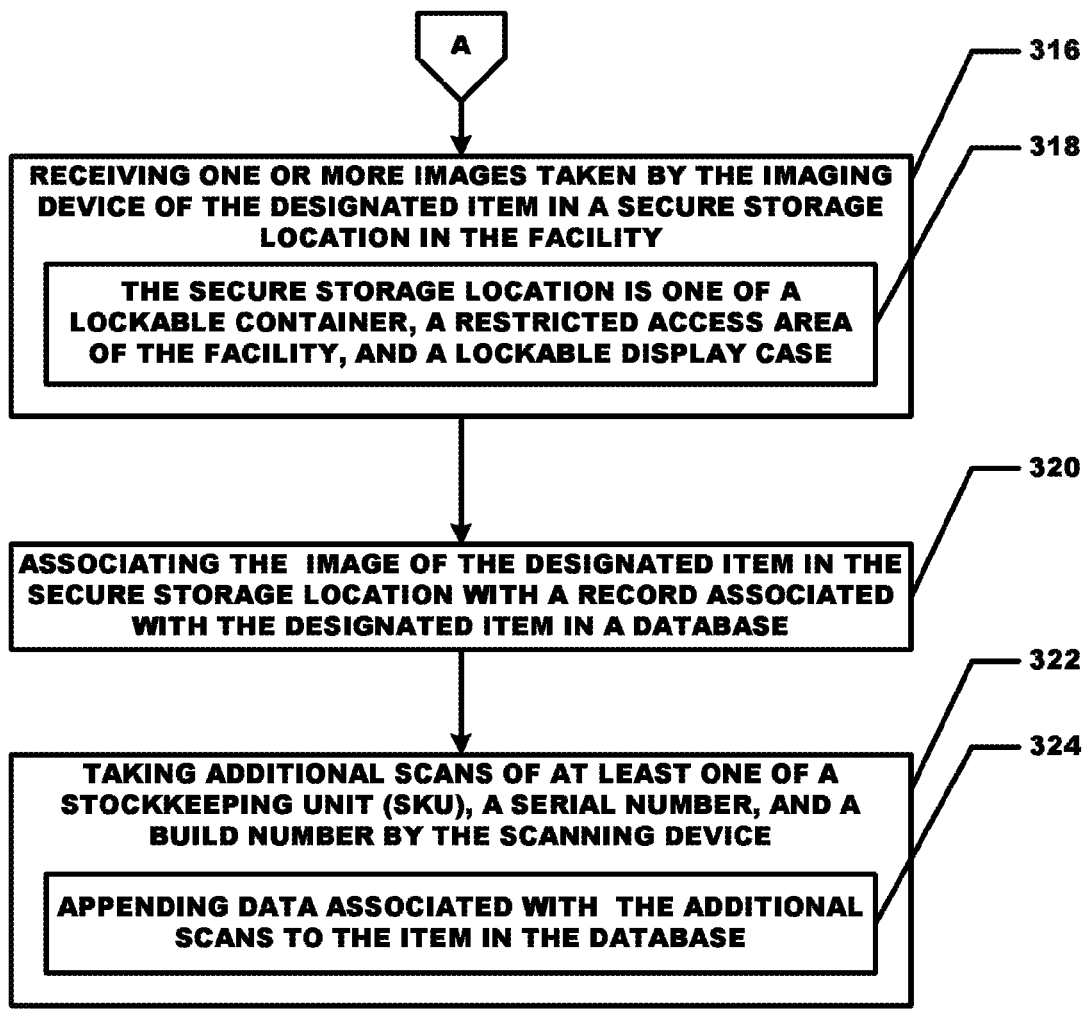

FIGS. 3A-3B are a flow diagram showing illustrative processing that can be implemented within a system for designated item processing in an exemplary embodiment. Rectangular elements are herein denoted "processing blocks" and may represent in part computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

FIGS. 3A-3B are a flowchart illustrating an exemplary method 300 for designated item processing, according to an example embodiment. The method 300 may be performed using one or more modules of system 100 described above.

An automated sorting system scans machine-readable identifiers of items that are received (step 302). The machine-readable identifiers may be bar codes, Radio Frequency Identification (RFID) tags or other type of machine-readable codes. The scanning of the machine-readable identifier includes capturing a time stamp (step 304).

Data related to the scanning of the machine-readable identifier affixed to the designated item is received from the scanning device (step 306). The automated sorting system sorts the scanned items into categories, wherein each category is associated with one of a plurality of conveyors or sets of rollers (step 308). For example, one conveyor or set of rollers may be for items to requiring special handling, while another conveyor or set of rollers may be for toys, and another conveyor or set of rollers for women's clothing.

A selected item is identified by the designation module as an item requiring special handling based on the scan of the machine-readable code (step 310). For example, the item may be identified as at least one of a high dollar value item, an item having a particular size, a regulated item, and a high theft item (step 312) by the designation module consulting a database of item information indicating the item category and item characteristics and the unique criteria for the facility at which the item is being processed. An item classified as a high dollar item has a price that exceeds a pre-determined threshold value for that particular facility location (step 314).

An item identified as requiring special handling is moved into a secure storage location. One or more images captured by one or more imaging devices of the item requiring special handling once it has been secured in the secure storage location are received by the designation module(step 316). The secure storage location may be, but is not limited to, one of a lockable container, a restricted access area of the facility and a lockable display case (step 318).

The image of the designated item in the secure storage location is associated with the data record associated with the item in a database (step 320). In some embodiments, additional scans are taken by a scanning device of one or more of a stock keeping unit (SKU), a serial number, and a build number (step 322). The data associated with the additional scans may also be appended to the record associated with the item in the database (step 324).

Figure 4:
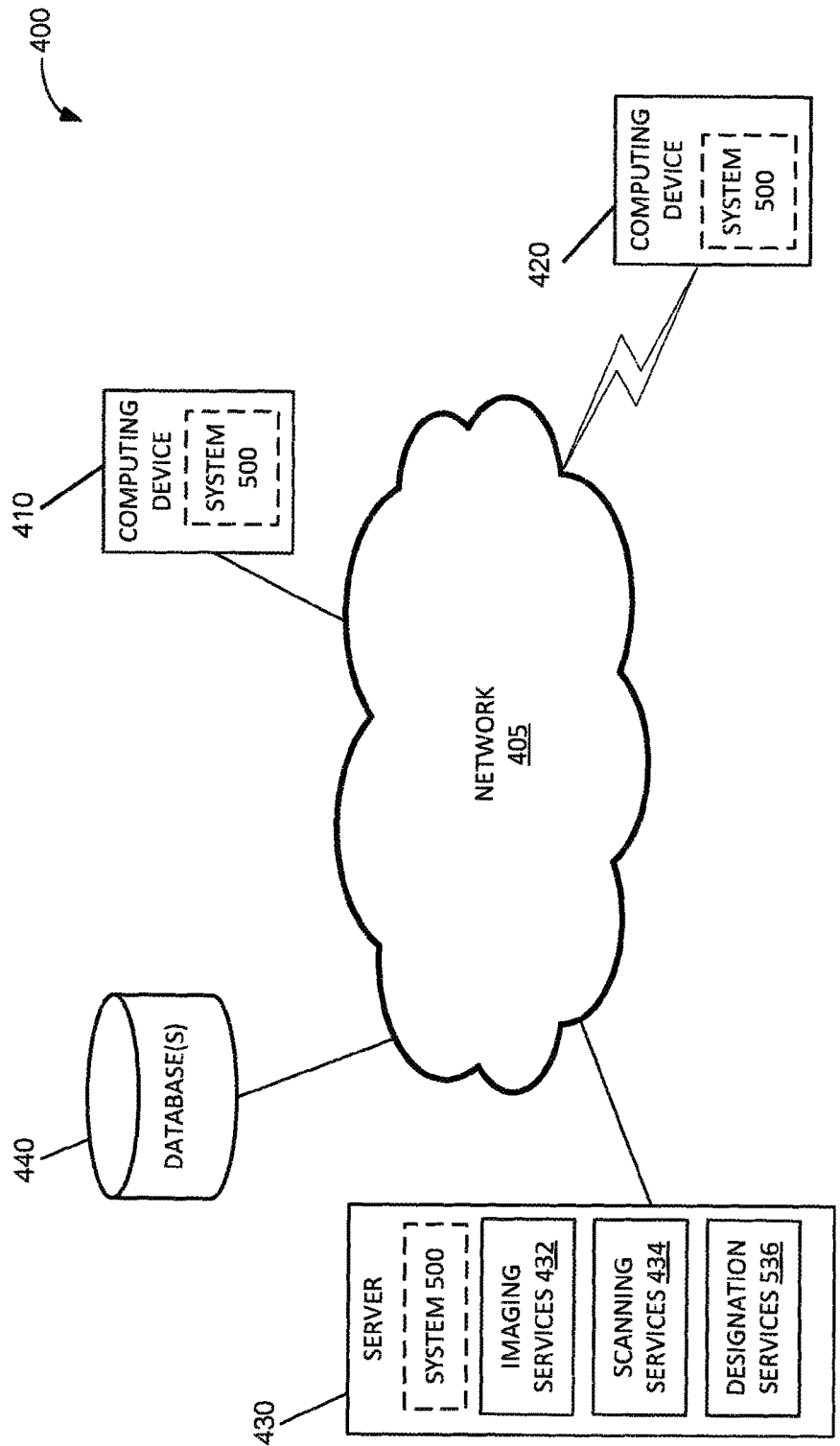
FIG. 4 is a diagram of an exemplary network environment suitable for use by exemplary embodiments.

FIG. 4 illustrates a network diagram depicting a system 400 for implementing the designated item processing system, according to an example embodiment. The system 400 can include a network 405, multiple computing devices, for example, computing device 410, computing device 420, a server 430, and database(s) 440. Each of the computing devices 410, 420, server 430, and database(s) 440 is in communication with the network 405.

In an example embodiment, one or more portions of network 405 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The computing devices 410, 420 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of computing devices 410, 420 may connect to network 405 via a wired or wireless connection. In an example embodiment, the computing devices 410, 420 may perform one or more of the functionalities of the designated item processing system 100 described herein, or transmit data or signals to the designated item processing system 100 described herein. For example, an individual may use the computing device 410, 420 to place his or her comments about a product. The computing device 410, 420 can include one or more components of computing device 500 of FIG. 5.

In an example embodiment, the special processing of designated items system 100 may be included at least in part on the computing device 410, 420, and the computing device 410, 420 performs one or more of the functionalities of the system described herein. In an example embodiment, the designated item processing system 100 may be included at least in part on the server 430, and the server 430 performs one or more of the functionalities of the dynamic delivery system 100 described herein.

The database(s) 440 comprise one or more storage devices for storing data and/or instructions (or code) for use by the server 430 and/or the computing devices 410, 420. Each of the database(s) 440 and the server 430 is connected to the network 405 via a wired connection. Alternatively, one or more of the database(s) 440 and server 430 may be connected to the network 405 via a wireless connection. The server 430 comprises one or more computers or processors configured to communicate with the computing devices 410, 420 via network 405. The server 430 can include one or more components of device 500 of FIG. 5. Server 430 hosts one or more software systems, applications or websites, including one or more components of the dynamic delivery system 100 described herein and/or facilitates access to the content of database(s) 440.

In an example embodiment, the server 430 also includes various software services that facilitate the functionalities of the customer feedback classification system 100. Database(s) 440 and server 430 may be located at one or more geographically distributed locations from each other or from computing devices 410, 420. Alternatively, database(s) 440 may be included within server 430.

Figure 5:
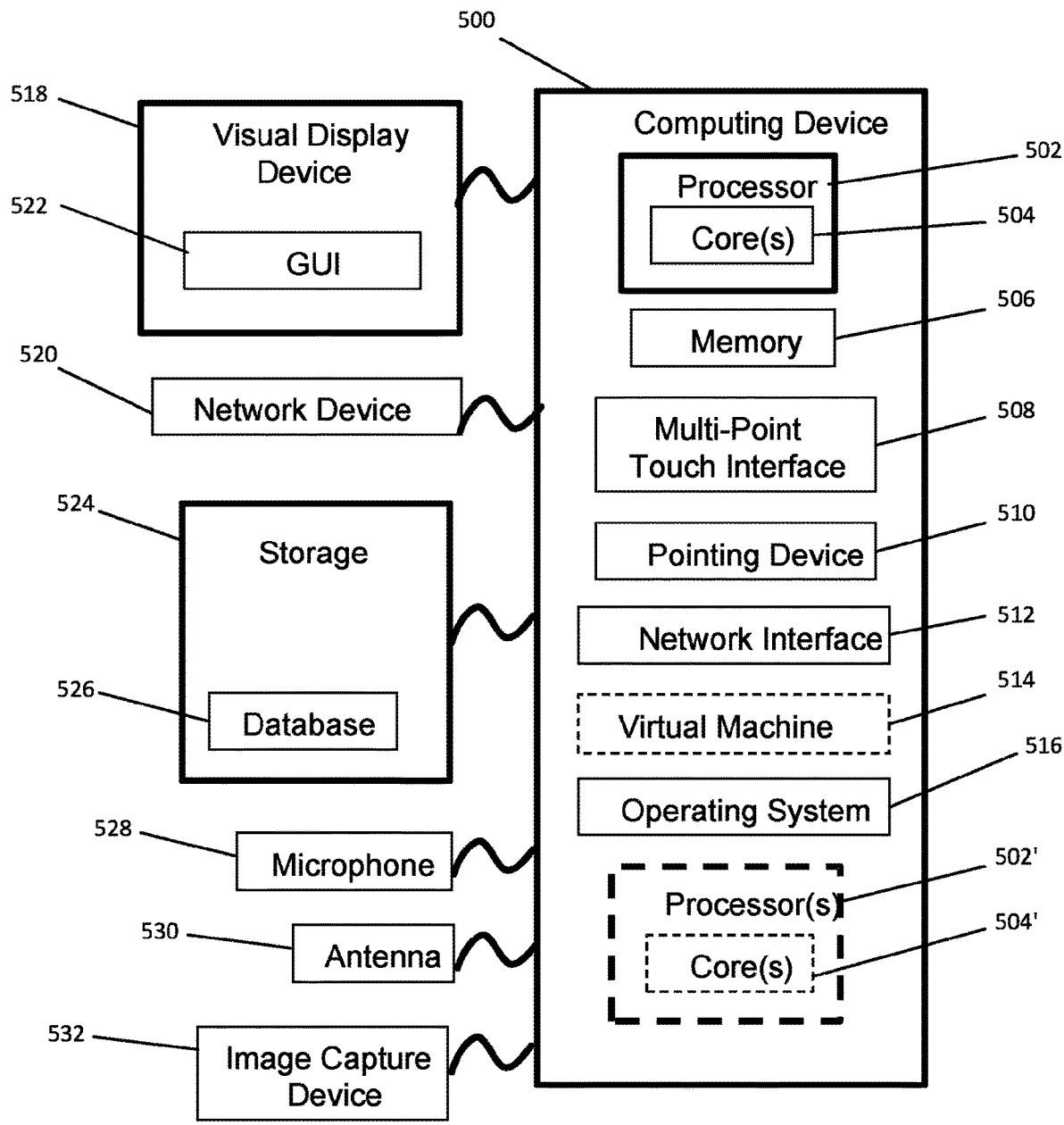
FIG. 5 is a block diagram of an exemplary computing device that may be used to implement exemplary embodiments.

FIG. 5 is a block diagram of an exemplary computing device 500 that can be used to perform one or more steps of the methods provided by exemplary embodiments. For example, computing device 500 may be the computing device 410, 420 and the server 430 as described in FIG. 4. The computing device 500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 506 included in the computing device 500 can store computer-readable and computer-executable instructions or software for implementing exemplary embodiments. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can include a computer system memory or random access memory, such as DRAM, SRAM, EDO RAM, and the like. Memory 506 can include other types of memory as well, or combinations thereof. An individual can interact with the computing device 500 through a visual display device 518, such as a touch screen display or computer monitor, which can display one or more user interfaces for receiving data from the individual (e.g., order data and travel data). The visual display device 518 can also display other aspects, elements and/or information or data associated with exemplary embodiments. The computing device 500 can include other I/O devices for receiving input from an individual, for example, a keyboard or another suitable multi-point touch interface 508, a pointing device 510 (e.g., a pen, stylus, mouse, or trackpad). The keyboard 508 and the pointing device 510 can be coupled to the visual display device 518. The computing device 500 can include other suitable conventional I/O peripherals.

The computing device 500 can also include one or more storage devices 524, such as a hard-drive, CD-ROM, or other computer-readable media, for storing data and computer-readable instructions and/or software, such as one or more modules of the system 100 shown in FIG. 1 that implements exemplary embodiments of the notification system as described herein, or portions thereof, which can be executed to generate user interface 522 on display 518. Exemplary storage device 524 can also store one or more databases 526 for storing suitable information required to implement exemplary embodiments. The databases can be updated by an individual or automatically at a suitable time to add, delete, or update one or more items in the databases. Exemplary storage device 524 can store one or more databases for storing provisioned data, and other data/information used to implement exemplary embodiments of the systems and methods described herein.

The computing device 500 can include a network interface 512 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or another device suitable for interfacing the computing device 500 to a type of network capable of communication and performing the operations described herein. Moreover, the computing device 500 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run an operating system 516, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 516 can be run in native mode or emulated mode. In an exemplary embodiment, the operating system 516 can be run on one or more cloud machine instances.

In an exemplary embodiment, one or more of the exemplary embodiments include one or more localized IoT devices and controllers that may provide some, or all, of the localized computing resources. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary as created under nominal conditions. In an exemplary embodiment, the kernel encodes relatively recent intermittent data ("KERRI"). As a result, in an exemplary embodiment, KERRI is a continuously utilized near term source of data, but KERRI may be discarded depending upon the degree to which such KERRI has any value. In an exemplary embodiment, KERRI may not even be utilized in any form if it is determined that KERRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels in order to filter out data that may reflect generic background data. In an exemplary embodiment, KRG incrementally sequences all future undefined cached kernels having encoded asynchronous data in order to filter out data that may reflect generic background data.

The description is presented to enable a person skilled in the art to create and use a computer system configuration and related method and systems for dynamic delivery scheduling. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for processing of designated items in a facility, the system comprising:
   an imaging device configured to take one or more images;
   a scanning device configured to scan a machine-readable identifier;
   a computing device communicatively coupled to the scanning device and the imaging device and configured to execute a designation module wherein the designation module, when executed:
   receives data related to a scanning of a first machine-readable identifier affixed to a first item from the scanning device;
   identifies the first item as a type of item requiring special handling as a designated item based on the data and a unique criteria derived for the facility, the unique criteria based at least in part on historical loss data associated with the facility;
   receives one or more images taken by the imaging device of the designated item located in a secure storage location in the facility; and
   associates the one or more images of the designated item in the secure storage location with a data record associated with the designated item in a database, wherein a record of a secure handling of the designated item and a condition of the designated item is created by storing the data record and the one or more images in the database.

2. The system of claim 1, wherein the designated item is one of a high dollar value item, an item having a particular size, a regulated item, and a high theft item.

3. The system of claim 2, wherein the high dollar value item has a price that exceeds a pre-determined threshold.

4. The system of claim 1, wherein the scan of the machine-readable identifier includes a time stamp.

5. The system of claim 4, wherein additional scans of at least one of a Stock keeping Unit (SKU), a serial number, and a build number are made by the scanning device.

6. The system of claim 5, wherein data associated with the additional scans is appended to the data record in the database.

7. The system of claim 1, wherein the secure storage location is one of a tower apparatus, lockable container, a restricted access area of the facility, and a lockable display case.

8. A computer-implemented method for processing designated items in a facility, the method comprising:
scanning with an automated sorting device that includes at least one of a plurality of conveyors and sets of rollers, machine-readable identifiers each respectively affixed to one of a plurality of items;
receives data related to scanning of a machine-readable identifier affixed to a first item of the plurality of items from the scanning device;
automatically sorting the plurality of items into two or more categories, each category associated with one of the plurality of conveyors or sets of rollers, and forwarding items in each category to one of the plurality of conveyors after being scanned based on the association; and
executing, by a computing device communicatively coupled to the automated sorting device, a designation module that when executed:
identifies the first item as a designated item requiring special handling based on the data and a unique criteria derived for the facility, the unique criteria based at least in part on historical loss data associated with the facility,
receives one or more images taken by the imaging device of the designated item located in a secure storage location in the facility, and
associates the images of the designated item in the secure storage location with a record associated with the designated item in a database.

9. The method of claim 8, wherein the designated item is one of a high dollar value item, an item having a particular size, a regulated item, and a high theft item.

10. The method of claim 9, wherein the high dollar value item has a price that exceeds a pre-determined threshold.

11. The method of claim 8, wherein the scanning of the machine-readable identifier includes capturing a time stamp.

12. The method of claim 11, further comprising taking additional scans of at least one of a Stock keeping Unit (SKU), a serial number, and a build number by the scanning device.

13. The method of claim 12, further comprising appending data associated with the additional scans to the record in the database.

14. The method of claim 8, wherein the secure storage location is one of a tower apparatus, lockable container, a restricted access area of the facility, and a lockable display case.

15. A non-transitory machine-readable medium storing instructions executable by a processing device, wherein execution of the instructions causes at least one processing device to:
receive data related to a scanning of a machine-readable identifier affixed to a first item from a scanning device;
identify the first item as requiring special handling as a designated item based on the data and a unique criteria derived for the facility, the unique criteria based at least in part on historical loss data associated with the facility;
receive one or more images of the designated item located in a secure storage location in the facility; and
associating the one or more images of the designated item in the secure storage location with a data record associated with the designated item in a database, wherein a record of a secure handling of the designated item and a condition of the designated item is created by storing the data record and the one or more images in the database.

16. The medium of claim 15, wherein the designated item is one of a high dollar value item, an item having a particular size, a regulated item, and a high theft item.

17. The medium of claim 16, wherein the high dollar value item is an item having a price that exceeds a pre-determined threshold.

18. The medium of claim 15, wherein the scan of the machine-readable identifier includes a time stamp.

19. The medium of claim 15, wherein the instructions when executed further cause the taking and storing of additional scans of at least one of a Stock keeping Unit (SKU), a serial number, and a build number made by the scanning device.

20. The medium of claim 19, wherein the additional scans are added to the record of the designated item in the database.

* * * * *